United States Patent
Onodera et al.

(10) Patent No.: US 7,986,354 B2
(45) Date of Patent: Jul. 26, 2011

(54) METHOD FOR CORRECTING PIXEL DEFECT OF IMAGE PICKUP DEVICE

(75) Inventors: Hideo Onodera, Kodaira (JP); Hirokazu Kono, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 387 days.

(21) Appl. No.: 12/379,389

(22) Filed: Feb. 20, 2009

(65) Prior Publication Data

US 2009/0237533 A1 Sep. 24, 2009

(30) Foreign Application Priority Data

Mar. 24, 2008 (JP) ................................. 2008-075619

(51) Int. Cl.
*H04N 9/64* (2006.01)

(52) U.S. Cl. ........................ 348/247; 348/246; 348/248

(58) Field of Classification Search .................. 348/246, 348/247, 248, E5.024, E5.037, E5.081
See application file for complete search history.

(56) References Cited

U.S. PATENT DOCUMENTS 6,950,133 B2 * 9/2005 Yoshiwara et al. ........... 348/247
7,206,020 B2 * 4/2007 Kato .............................. 348/247

* cited by examiner

*Primary Examiner* — David N Spector
(74) *Attorney, Agent, or Firm* — Bacon & Thomas, PLLC

(57) ABSTRACT

A method for correcting a pixel defect of a solid-state image pickup device includes acquiring deviation of image signals obtained by imaging respective spectral lights at specific image pickup position or at vicinities of the specific image pickup position by image pickup device; comparing the deviation with a reference value; detecting a pixel defect in an image pickup device which has imaged one of the spectral lights based on the comparing result; and correcting a pixel defect. For each detected pixel defect, at least address in an image frame, deviation, and information specifying one of the spectral lights are stored, and a determination on a pixel defect correction is made based on the above information.

2 Claims, 5 Drawing Sheets

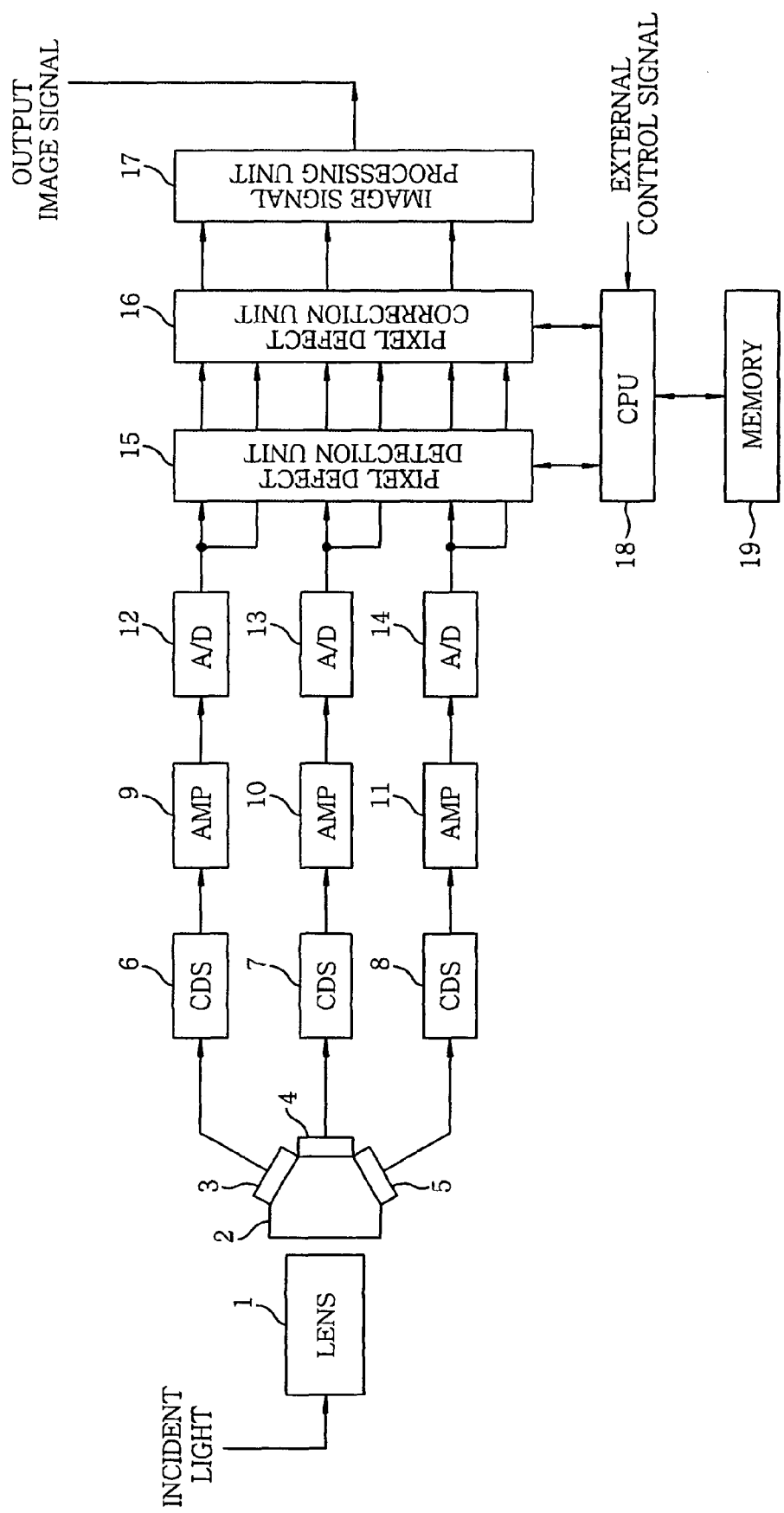

R CHANNEL

G CHANNEL

B CHANNEL

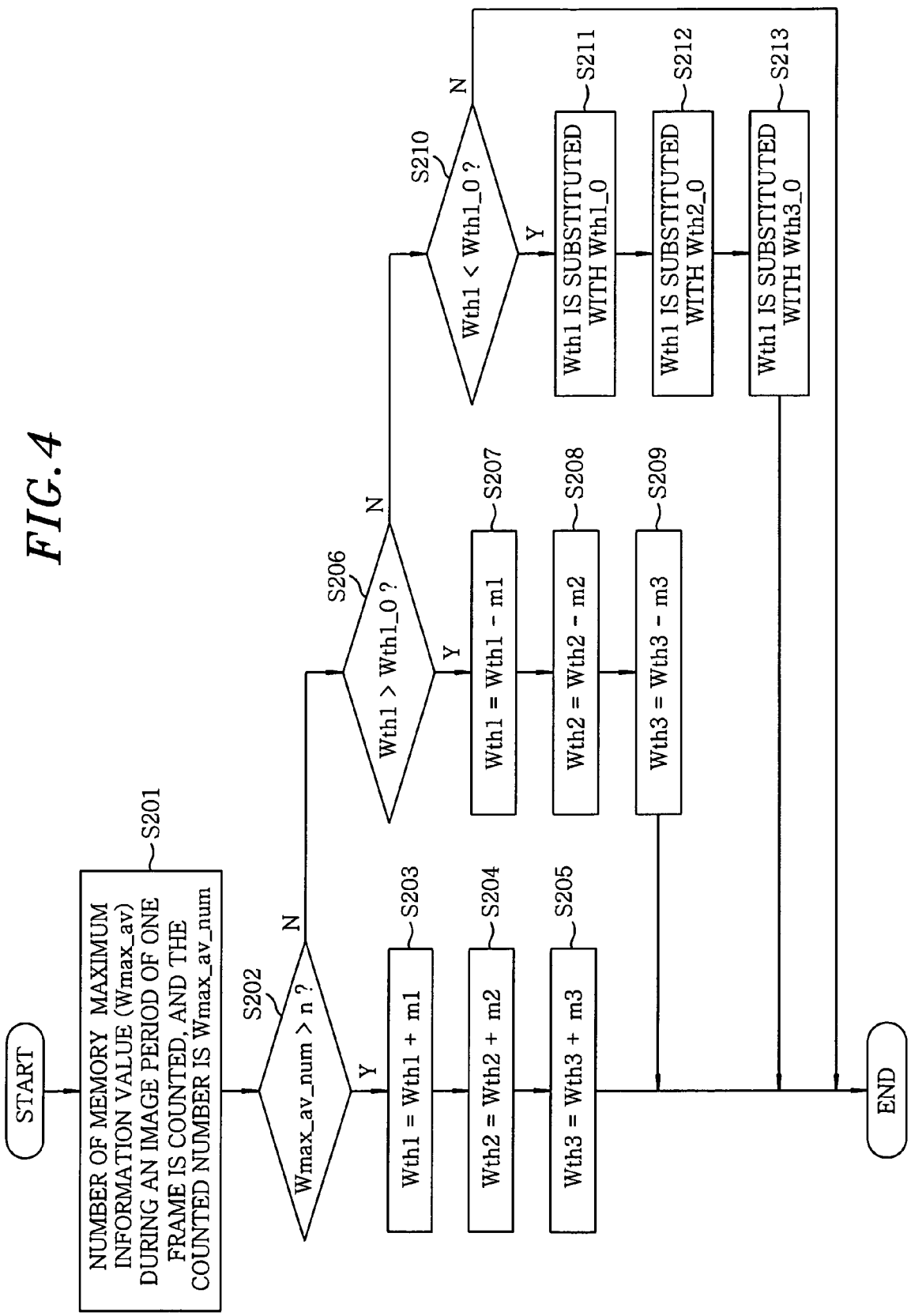

METHOD FOR CORRECTING PIXEL DEFECT OF IMAGE PICKUP DEVICE

FIELD OF THE INVENTION

The present invention relates to an imaging apparatus, such as a television camera; and, more particularly, to a method for correcting a pixel defect of an image pickup device.

BACKGROUND OF THE INVENTION

Conventionally, a pixel defect of a solid-state image pickup device of a television camera has been detected by comparing image signals of respective spectral lights obtained by dispersing incident light, the image signals being taken by image pickup devices at a same image pickup position or substantially same positions of the dispersed spectral lights. Then, based on the comparing result, a pixel defect in an image pickup device which has imaged one of the spectral lights is detected, and corrected (e.g., see Japanese Patent Laid-open Application No. 2002-44688).

Since random noise components are superimposed on each of image signals taken by the image pickup devices, a detection error is introduced in a pixel defect detection signal, so that it is difficult to detect a pixel defect having a level less than that of the random noise. For this reason, the conventional method has only limited applications, such as an extended exposure type camera and the like, of which the pixel defect detection signal level is relatively greater than the random noise.

SUMMARY OF THE INVENTION

In accordance with the present invention, there is provided a method for correcting a pixel defect of a solid-state image pickup device imaging respective spectral lights obtained by dispersing incident light and outputting image signals.

The method includes acquiring deviation of image signals obtained by imaging respective spectral lights at specific image pickup position or at vicinities of the specific image pickup position by image pickup devices; comparing the deviation with a reference value; detecting, based on a comparing result, a pixel defect in an image pickup device which has imaged one of the spectral lights; and correcting the pixel defect.

For each detected pixel defect, at least address in an image frame, deviation, and information specifying one of the spectral lights are stored, and a determination on a pixel defect correction is made based on the above information.

Further, the stored information of a detected pixel defect is preferably updated every image frame.

Further, when the address and the specifying information of the spectral light of the detected pixel defect correspond with the stored pixel defect information, the detected deviation and the stored deviation are weight-averaged at a specific ratio, and the weighted average value is stored as a new deviation.

The address, deviation, and the specifying information of the spectral light of the detected pixel defect are stored when the address and the specifying information of the spectral light of the detected pixel defect are not included in the stored pixel defect information.

In the stored pixel defect address, when no pixel defect is detected or the specifying information of the spectral light is different from the stored information in case where a pixel defect is detected, the stored deviation of the corresponding pixel defect is subtracted by a specific value, and new deviation information is stored.

When the deviation value from the new deviation information is less than a specific value, the stored address, deviation, and the specifying information of the spectral light of the pixel defect are removed.

When the number of the stored information of the pixel defect is beyond a specific value, the value used to compare with the deviation is increased to thereby decrease the number of pixel defects.

In accordance with the present invention, it is possible to detect a pixel defect of a pixel defect detection signal which is less than the random noise superimposed on the image signal and correct the pixel defect.

Further, it is possible to perform the pixel defect correction in an order of pixel defect level within a preset memory capacity.

BRIEF DESCRIPTION OF THE DRAWINGS

The above and other objects and features of the present invention will become apparent from the following description of embodiments given in conjunction with the accompanying drawings, in which:

FIG. 1 is a block diagram illustrating an imaging apparatus of an embodiment of the present invention;

FIG. 4 is a flow chart for illustrating image processing in accordance with another embodiment of the present invention.

DETAILED DESCRIPTION OF THE EMBODIMENTS

Figure 2A:
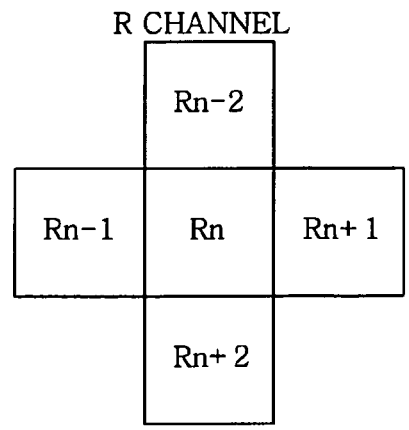
FIGS. 2A to 2C are views for illustrating a first pixel and a group of second pixels for each of R,G and B channel of image pickup devices.

Embodiments of the present invention will be described with reference to the accompanying drawings which form a part hereof.

FIG. 1 is a block diagram schematically illustrating an imaging apparatus in accordance with an embodiment of the present invention. In FIG. 1, reference numeral 1 denotes a lens unit for focusing light incident from an object to be imaged and 2 is a prism for dispersing the incident light passing through the lens unit into spectral lights having wavelengths of, e.g., red, green and blue (hereinafter abbreviated as R, G and B). Further, reference numerals 3 to 5 are charge coupled devices, i.e., R-CCD, G-CCD and B-CCD, respectively. Each CCD has light receiving elements (pixels), each receiving a part of the spectral light from the prism 2 to convert it into electric charges in accordance with an amount of spectral light received in each pixel and storing the electric charges obtained by the photoelectric conversion.

Reference numerals 6 to 8 denote correlated double sampling (CDS) units receiving with image signals produced by successively reading out the electric charges stored in the light receiving elements of the R-CCD 3, G-CCD 4 and B-CCD 5, respectively. The CDS units 6 to 8 remove noise components contained in the inputted image signals to sample and hold only signal components, so that the image signals from which the noise components are removed are produced from the CDS units 6 to 8. Reference numerals 9 to 11 are amplifier units in which the image signals produced from the CDS units 6 to 8 are respectively subjected to image signal processings such as gain correction and gamma correction. Reference numerals 12 to 14 denote A/D converters which converts the image-processed analog image signals from the amplifier units 9 to 11 into digital image signals, respectively.

Reference numeral 15 denotes a pixel defect detection unit which detects a pixel defect on a pixel-by-pixel basis based on digital image signals for respective colors produced from the A/D converters 12 to 14 and produces a signal indicative of a position of the detected pixel and a defect signal level of the detected pixel defect. Reference numeral 16 is a pixel defect correction unit for correcting the pixel defect of the digital image signals produced from the A/D converters 12 to 14 in accordance with the signal indicative of the detected pixel position and the defect signal level detected by the pixel defect detection unit 15 and producing the corrected image signals to be transferred to an image signal processing circuit 17.

In the image signal processing unit 17, the corrected image signals are subjected to a conversion processing for an image signal format or the like and the processed image signals are supplied to the subsequent stage (not shown). Reference numeral 18 denotes a central processing unit (CPU) for controlling the R-CCD 3, G-CCD 4 and B-CCD 5 and the aforementioned units to operate at predetermined timings and establishing external control between the imaging apparatus and an external apparatus (not shown).

Next, operations of the pixel defect detection unit 15 and the pixel defect correction unit 16 are described. Herein, a case in which a white noise occurs in an image due to a pixel defect is described. A defect signal level of a pixel defect due to the white noise appears as a peak component having a signal level relatively higher than image signal levels of surrounding pixels thereof. Therefore, a value of the image signal (defect signal) level of the pixel defect due to the white noise is relatively larger than an average value of the image signal levels of the surrounding pixels and a difference value obtained by subtracting the average value from the value of the defect signal level is also large.

On the other hand, image signal levels of normal pixels having no pixel defect are almost the same as the image signal levels of the surrounding pixels in almost all image pickup conditions, for example, in conditions where imaging is usually taken by imaging apparatus in almost same viewing conditions as the general viewing condition of a human being. Accordingly, the value of the image signal level of the normal pixel is almost same as the average value of the image signal levels of the surrounding pixels thereof, and the difference value obtained by subtracting the average value from the value of the image signal level of the normal pixel is relatively small.

Further, for example, when a certain inspected pixel of the R channel has a pixel defect due to white noise, the possibility that any one or both of pixels of G and B channels at the image pickup position of the incident (imaging) light corresponding to the inspected pixel of the R channel are also defective similarly to the inspected pixel of the R channel is very small. That is, it can be safely said that at the most one of the R, G and B channel pixels corresponding to any image pickup position in the incident light may be defective.

Accordingly, in an example where the inspected pixel for the R channel corresponding to a certain image pickup position within incident light to be imaged is assumed to have a white noise defect, it is expected that a difference value between a signal level of the inspected pixel of R channel and an average value of signal levels of surrounding pixels thereof is relatively large as described above. Further, a difference value between a signal level of a pixel of each of the G and B channels corresponding to the same image pickup position and an average value of signal levels of surrounding pixels thereof can be safely assumed to be small.

Accordingly, respective difference values for the R, G and B channels of pixels corresponding to the same image pickup position in the incident light may be processed to be compared with one another, for example, so that whether a pixel defect occurs in a pixel for any one of the R, G and B channels or not can be detected.

Figure 3A:
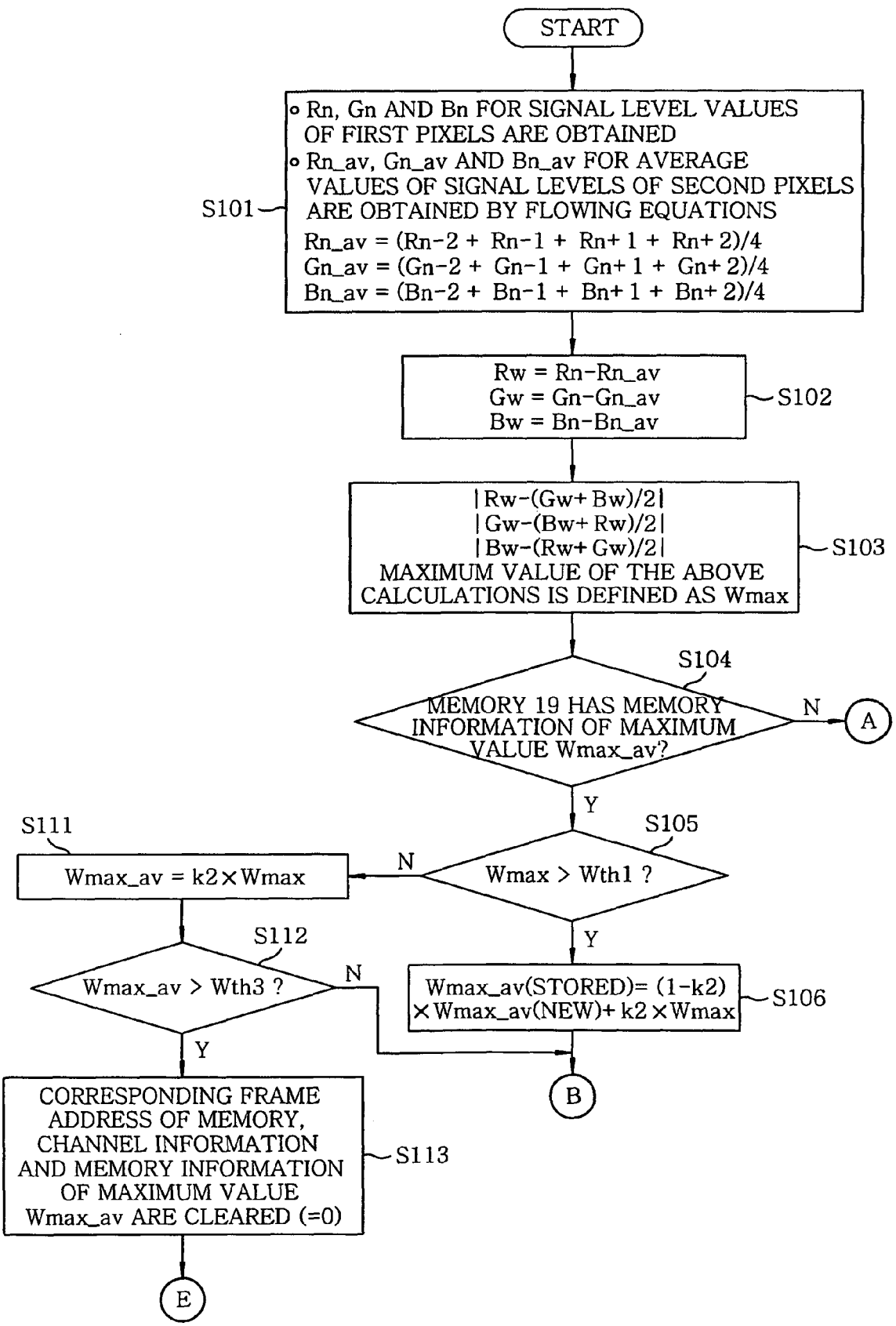
FIGS. 3A and 3B are flow charts for illustrating an image processing in accordance with an embodiment of the present invention.
Figure 3B:
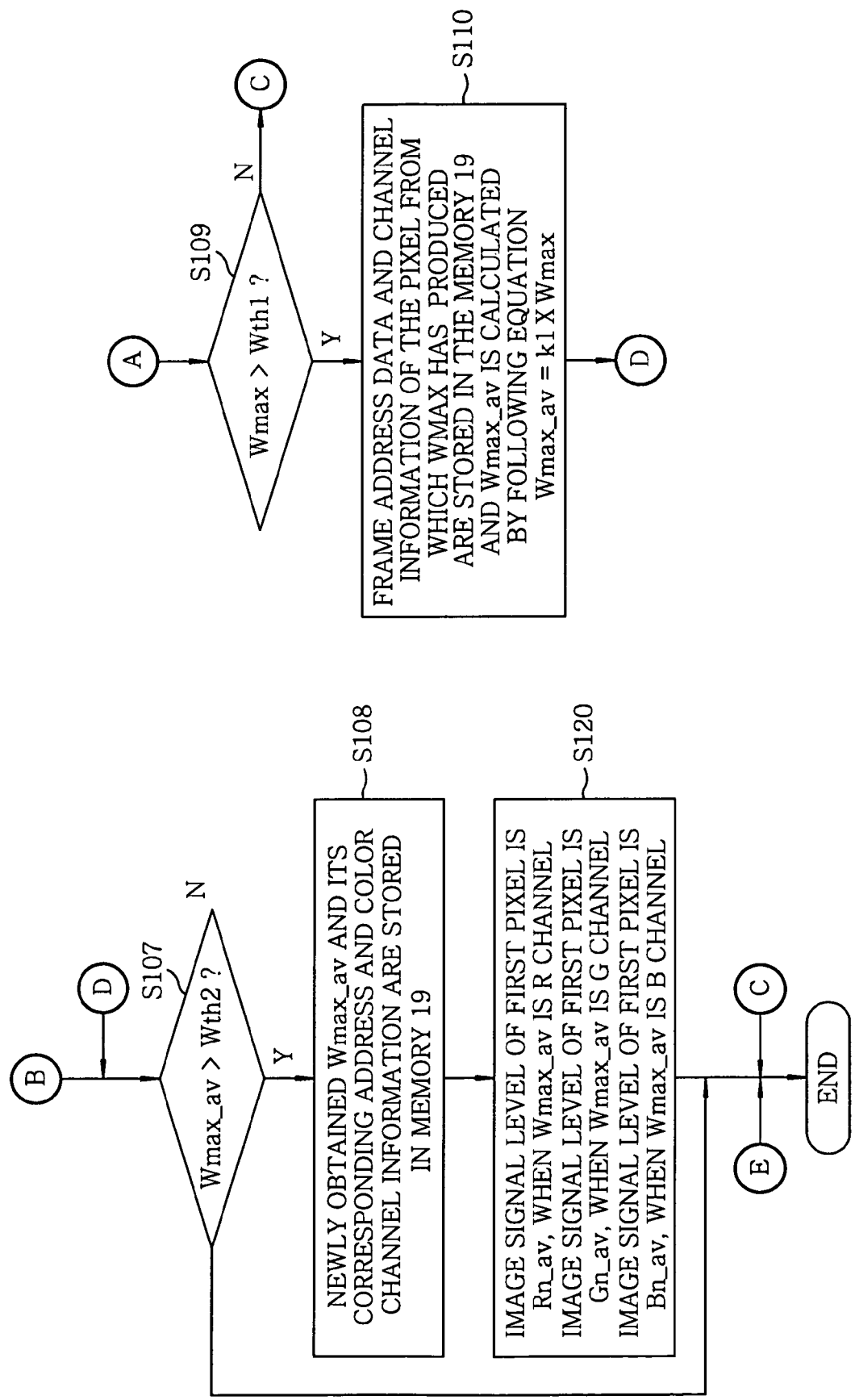

Hereinafter, a pixel defect detecting method in accordance with an embodiment of the present invention will be described. Incident light passing through the lens unit 1 of the imaging apparatus in accordance with the present invention is dispersed by the prism 2 to obtain spectral lights of the R, G and B channels. The spectral lights for the respective channels are received by the R-CCD 3, G-CCD 4 and B-CCD 5. In each of the charge coupled devices 3 to 5, the spectral light is subjected to photoelectric conversion to obtain electric charges in accordance with an amount of spectral light received in each pixel. The electric charges are accumulated and outputted successively so that the image signals for respective channels are produced. The image signals are inputted to the pixel defect detection unit 15 through the CDS units 6 to 8, the amplifier units 9 to 11 and the A/D converters 12 to 14. The pixel defect detection unit 15 and the pixel defect correction unit 16 detect and correct a defective signal portion of the inputted image signals due to a pixel defect by using the signal process sequence as shown in FIGS. 3A and 3B.

The embodiment of the present invention will be described with reference to FIGS. 2A to 3B.

A detection procedure for a defective signal portion due to a pixel defect is as follows. First, image signal levels for image pickup positions of interest within the incident light, for example, image signal levels for the pixels (hereinafter, referred to as first pixels in the respective channels) at image pickup positions An, which correspond to $n_{th}$ elements of the light receiving elements arrayed in a matrix form on the charge coupled devices 3 to 5, are referred to as Rn, Gn and Bn for the respective channels. Further, pixels (hereinafter, referred to second pixels for the respective channels) in the vicinity of the first pixels for the respective channels are properly selected.

Figure 2B:
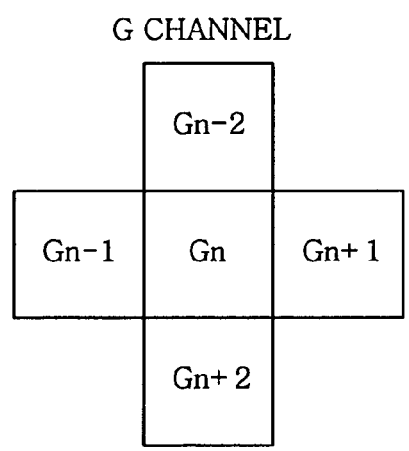
Figure 2C:
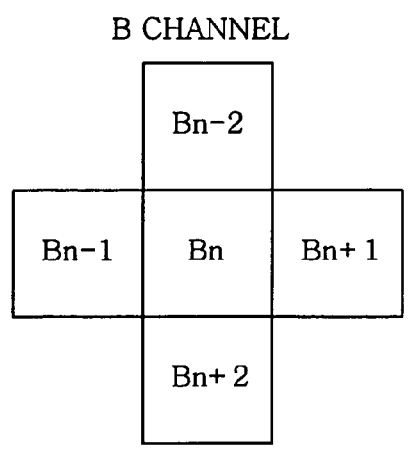

FIGS. 2A to 2C are views for illustrating examples of the first pixel and the group of second pixels of the R-CCD 3, G-CCD 5, and B-CCD 5. In this example, four pixels at positions directly upper, lower, left and right side of the first pixel are selected as the second pixels.

FIG. 2A is a view illustrating am example of the first pixel and the second group of pixels of the R-CCD 3. Rn denotes an image signal taken at the position of the first pixel, and Rn−2, Rn−1, Rn+1, and Rn+2 denote image signals taken at positions of the second pixels.

FIG. 2B is a view of an example of the first pixel and the group of second pixels of the G-CCD 4. Gn denotes an image signal taken at the position of the first pixel, and Gn−2, Gn−1, Gn+1, and Gn+2 denote image signals taken at positions of the second pixels.

FIG. 2C is a view of an example of the first pixel and the group of second pixels of the B-CCD 5. Bn denotes an image signal taken at the position of the first pixel, and Bn−2, Bn−1, Bn+1, and Bn+2 denote image signals taken at positions of the second pixels.

FIGS. 3A and 3B are flow charts illustrating processes of detecting and correcting a pixel defect on a pixel-by-pixel basis in accordance with the embodiment of the present invention. In FIGS. 3A and 3B, a pixel defect of a corresponding frame in the image pickup devices is detected and data, such as an address, a color channel, and a maximum value for the detected pixel is stored in the memory 19. A frame correlation (integration) between pixel defect data of previous frames and pixel defect data of a current frame is obtained, and when the maximum value is beyond a threshold value, it is determined that a pixel defect is detected, so that a pixel defect correction is performed. When the maximum value data Wmax_av obtained in the current frame is equal to or less than a predetermined threshold Wth3, the memory information stored in the memory 19 is cleared. With this process, it is also possible to remove random noises.

With reference to FIGS. 3A and 3B, the pixel defect detection unit 15 and pixel defect correction unit 16 is described. In step S101, averages of signal levels, i.e., Rn_av, Gn_av, and Bn_av for the group of second pixels are obtained from Eqs. 1 to 3 as follows:

$$Rn\_av=(Rn-2+Rn-1+Rn+1+Rn+2)/4 \quad \text{Eq.1;}$$

$$Gn\_av=(Gn-2+Gn-1+Gn+1+Gn+2)/4 \quad \text{Eq.2; and}$$

$$Bn\_av=(Bn-2+Bn-1+Bn+1+Bn+2)/4 \quad \text{Eq.3.}$$

Various calculation methods or signal combinations other than the above may be used in calculating an average of the image signal levels for each group of the second pixels.

In step S102, difference values Rw, Gw, and Bw are calculated by subtracting the average values of the image signal levels for the groups of the second pixels from the image signal levels of the first pixel as shown by the following Eqs. 4 to 6:

$$Rw=Rn-Rn\_av \quad \text{Eq.4;}$$

$$Gw=Gn-Gn\_av \quad \text{Eq.5; and}$$

$$Bw=Bn-Bn\_av \quad \text{Eq.6.}$$

In step S103, in order to compare the difference values Rw, Gw, and Bw with one another, a deviation of each channel is calculated by subtracting from the difference value of the channel an average value of difference values from the other two channels, and the maximum one of the calculated deviations for the respective channels is selected as Wmax. The deviation for each channel is obtained from the following Eqs. 7 to 9:

$$R \text{ channel deviation}=|Rw-(Gw+Bw)/2| \quad \text{Eq.7;}$$

$$G \text{ channel deviation}=|Gw-(Bw+Rw)/2| \quad \text{Eq.8; and}$$

$$B \text{ channel deviation}=|Bw-(Rw+Gw)/2| \quad \text{Eq.9.}$$

Next, in step S104, it is determined whether a maximum memory information Wmax_av is stored at an address of the memory 19 corresponding to an address in the frame (i.e., the $n_{th}$ pixel position of the frame). If the maximum memory information Wax_av exists at the address of the memory 19 and has a same color channel, step S105 is performed, and if not, step S109 is performed.

In step S105, the maximum deviation Wmax obtained in step S103 and a predetermined threshold Wth1 are compared with each other. When Wmax is greater than Wth1, the step S106 is performed. Otherwise, the step S111 is performed.

In step S106, Wmax_av is calculated by the following Eq. 10, and then, step S107 is performed. Herein, k2 is a predetermined coefficient (0<k2<1).

$$Wmax\_av(\text{new})=(1-k2)\times Wmax\_av(\text{stored})+K2\times Wmax \quad \text{Eq.10.}$$

In step S109, the maximum deviation Wmax obtained in step S103 and the predetermined threshold value Wth1 are compared with each other. When Wmax is greater than Wth1, step S110 is performed. Otherwise, the process goes to the end.

In step 110, address data in the frame and color channel information of the pixel from which Wmax has produced are stored in the memory 19 and Wmax_av is calculated by the following Eq. 11. Then, the step S107 is performed. Here, k1 is a predetermined coefficient (0<k1≦1).

$$Wmax\_av=k1\times Wmax \quad \text{Eq.11.}$$

In step S111, Wmax_av is calculated by Eq. 12 below, and then, step S112 is performed.

$$Wmax\_av=k2\times Wmax \quad \text{Eq.12.}$$

In step S112, the maximum value memory information Wmax_av obtained from step S111 and a predetermined threshold value Wth3 are compared with each other (Wth3<Wth1). When Wmax is greater than Wth3, the process goes to step S107. If otherwise, step S113 is performed.

In step S113, the address data in the frame and color channel information stored in the memory 19, and the maximum value memory information Wmax_av corresponding to those are cleared(=0), i.e., deleted, and then, the process is terminated.

In step S107, the newly obtained maximum value memory information Wmax_av and the predetermined threshold value Wth2 are compared with each other (Wth2>Wth3). When Wmax_av is greater than Wth2, step S108 is performed. If otherwise, the process is terminated.

In step S108, the newly obtained Wmax_av and its corresponding address and color channel information are stored in the memory 19 and the process proceeds to step s 120. If there exists Wmax_av in the memory 19, it is updated with the newly obtained Wmax_av.

In step S120, an image signal level of the first pixel is set to Rn_av when Wmax_av is for the R channel, the image signal level of the first pixel is set to Gn_av when Wmax_av is for the G channel, and the image signal level of the first pixel is set to Bn_av when Wmax_av is for the B channel. And then, the process is terminated and the detection and correction of a pixel defect are finished.

The steps S101 to S113 are performed by the pixel defect detection unit 15 and the step S120 is performed by the pixel defect correction unit 16.

As described above, for example, when Rn is a defect signal level due to a pixel defect, Rn_av instead of the defect signal level Rn is employed as the image signal level to correct a pixel defect.

Further, in each of cases when Wmax is less than the predetermined threshold value Wth1 in step S109, Wmax_av is less than the predetermined threshold value Wth2 in step S107, and Wmax_av is less than the predetermined threshold value Wth3 in step S112, it is determined that no defect is detected in the pixel corresponding to the image pickup position.

With reference to a flow chart in FIG. 4, another embodiment of the present invention will be described. FIG. 4 illustrates a flow for performing a pixel defect correction in an order of a pixel defect level within a range of a predetermined memory capability.

The process of FIG. 4 is to change the threshold values Wth1, Wth2 and Wth3 of FIGS. 3A and 3B.

The step S201 counts the number of the maximum memory information Wmax_av's stored in the memory 19 during an image period of one frame and sets the counted number as the Wmas_av_num, and then, the process goes to step S202.

In step S202, for performing the defect correction within a preset memory capacity of the memory 19, a number n corresponding to the preset memory capacity is compared with Wmax_av_num. As the result, when Wmax_av_num is greater than n, the process proceeds to step S203. Otherwise, the process proceeds to step S206.

In step S203, a preset value m1 is added to the threshold value Wth1 to obtain a new threshold value Wth1 by Eq. 13 below, and then, step S204 is performed.

$$Wth1=Wth1+m1 \; (m1>0) \quad \text{Eq. 13.}$$

In step S204, a preset value m2 is added to the threshold value Wth2 to obtain a new threshold value Wth2 by Eq. 14 below, and then, step S205 is performed.

$$Wth2 = Wth2 + m2 (m2>0) \quad \text{Eq. 14.}$$

In step S205, a preset value m3 is added to the threshold value Wth3 to obtain a new threshold value Wth3 by Eq. 15 below, and the process of FIG. 4 is ended.

$$Wth3 = Wth3 + m3 (m3>0) \quad \text{Eq. 15.}$$

In step 206, a predetermined value Wth1_0 is compared with Wth1, and when Wth1 is greater than Wth1_0, step S207 is performed. Otherwise, step S210 is performed.

In step S207, by Eq. 16 below, m1 is subtracted from the threshold value Wth1 to get a new Wth1, and then, the process proceeds to step 208.

$$Wth1 = Wth1 - m1 \quad \text{Eq. 16.}$$

In step S208, by Eq. 17 below, m2 is subtracted from the threshold value Wth2 to get a new Wth2, and then, the process proceeds to step 209.

$$Wth2 = Wth2 - m2 \quad \text{Eq. 17.}$$

In step S209, by Eq. 18 below, m3 is subtracted from the threshold value Wth3, and then, the process of FIG. 4 is ended.

$$Wth3 = Wth3 - m3 \quad \text{Eq. 18.}$$

In step 210, the predetermined value Wth1_0 is compared with Wth1, and when Wth1 is smaller than Wth1_0, the process proceeds to step S211, and when Wth1 is not smaller than Wth1_0, the process of FIG. 4 is ended.

In step S211, Wth1_0 is substituted for the threshold value Wth1 as a new threshold value Wth1, and then, step S212 is performed.

In step S212, Wth2_0 is substituted for the threshold value Wth2 as a new threshold value Wth2, and then, step S213 is performed.

In step S213, Wth3_0 is substituted for the threshold value Wth3 as a new threshold value Wth3, and then, the process of FIG. 4 is ended.

In the forgoing, the process sequence for the pixel defect detection and correction is described where the defect affects only own pixel which catches incident light. The sequence can be repeated in response to the output operation of the image signal from the solid state image pickup devices while changing a pixel to be inspected successively each time the image signal for each pixel is produced, so that the pixel defect detection and correction can be performed pixel by pixel in real time.

Further, in the present invention, a signal for setting the pixel defect defection and correction is sent to the CPU 18 by operator's operation by using a menu screen (not shown) of the imaging apparatus or by an external control signal produced by using the external control function, so that signals for controlling the pixel defect detection unit 15 and the pixel defect correction unit 16 are sent to these units 15 and 16 from the CPU 18. With such control, control as to whether correction is made for each pixel defect or not may be made externally and the defect signal level of the pixel defect to be corrected or the thresholds for the pixel defect detection can be changed in accordance with image conditions (whether charges are accumulated or not, charge storage time, gain of image and the like).

As described above, the pixel defect detection and correction can be made pixel by pixel in real time by repeating the processing successively each time the image signal for each pixel is produced, without the need of providing a signal processing period separately from the image signal period and without using a scaled circuit pixel defect correction circuit. Further, the need of detecting a position of pixel causing a pixel defect in advance. Further, even if the number of pixel defects is increased, the time of detecting the position of pixel causing pixel defect again and writing it in a memory or the like, which has been required in the prior art can be avoided.

Further, control as to whether correction is made or not for each pixel defect can be made externally based on a defect signal level of a detected pixel defect. The defect signal level of the pixel defect to be corrected or the thresholds for the pixel defect detection can be changed in accordance with image conditions (whether charges are accumulated or not, charge storage time, gain of image and the like). For example, a pixel defect detection level, i.e., a white noise detection level can be changed in accordance with a storage time so that increased and reduced pixel defect (white noise) caused by change of the storage time can be corrected properly.

As described above, the present invention stores detected pixel defect information (address, deviation, spectral light channels), and allows random noises to be removed by successively weight-averaging the pixel defects having the same image address and the same spectral light channel in the image frame.

Further, in order not to increase the number of pixel defect information stored in the memory 19 due to detected defects caused by noise effects, when the level of pixel defect deviation detected at the stored address with a specific light channel is equal to or less than a threshold, the pixel defect information stored in the memory 19 corresponding to the address is removed.

The present invention realizes a pixel defect correction with a limited memory capacity. When the number of detected pixel defects increases beyond a memory capacity, a pixel defect correction cannot be made to the remaining portion of the image. To prevent this, the number of pixel defects is counted, and when the number of pixel defects approaches to the memory capacity, threshold values for detecting a detective pixel is increased. Accordingly, the present invention may perform the correction, in a decreasing order of pixel defect level, to the number of pixel defects covered by the memory capacity.

While the invention has been shown and described with respect to the embodiments, it will be understood by those skilled in the art that various changes and modification may be made without departing from the scope of the invention as defined in the following claims.

What is claimed is:

1. A method for correcting a pixel defect of a solid-state image pickup device imaging respective spectral lights obtained by dispersing incident light and outputting image signals, the method comprises:
   acquiring deviation of image signals obtained by imaging respective spectral lights at specific image pickup position or at vicinities of the specific image pickup position by image pickup devices;
   comparing the deviation with a reference value;
   detecting, based on a comparing result, a pixel defect in an image pickup device which has imaged one of the spectral lights; and
   correcting the pixel defect,
   wherein for each detected pixel defect, at least address in an image frame, deviation, and information specifying one of the spectral lights are stored, and a determination on a pixel defect correction is made based on the above information.

2. The method of claim 1, wherein the stored information of a detected pixel defect is updated every image frame.

* * * * *